United States Patent [19]

Roovers et al.

[11] Patent Number: 5,545,105
[45] Date of Patent: Aug. 13, 1996

[54] METHOD FOR INFLUENCING THE DRIVING BEHAVIOUR OF A VEHICLE WITH A CONTINUOUSLY VARIABLE TRANSMISSION

[75] Inventors: Wilhelmus C. W. M. Roovers, Prinsenbeek; Bastiaan A. d'Herripon, Tilburg; Chi C. Choi, Eindhoven, all of Netherlands

[73] Assignee: Van Doorne's Transmissie B.V., Tilburg, Netherlands

[21] Appl. No.: 76,611

[22] Filed: Jun. 14, 1993

[30] Foreign Application Priority Data

Jun. 15, 1992 [NL] Netherlands ............................ 9201051

[51] Int. Cl.$^6$ ................................................ B60K 41/14
[52] U.S. Cl. ................................................ 477/43
[58] Field of Search ........................... 477/43, 48, 46

[56] References Cited

U.S. PATENT DOCUMENTS

| 4,671,140 | 6/1987 | Koshio . | |
|---|---|---|---|
| 4,793,217 | 12/1988 | Morisawa et al. | 477/48 |
| 4,926,716 | 5/1990 | Hirano et al. . | |
| 4,945,483 | 7/1990 | Tokoro | 477/48 |
| 5,056,380 | 10/1991 | Sawasaki et al. . | |

FOREIGN PATENT DOCUMENTS

| 0451887A1 | 3/1991 | European Pat. Off. . | |
|---|---|---|---|
| 3428098A1 | 2/1985 | Germany . | |
| 4120546 | 12/1992 | Germany | 477/46 |
| 3275436 | 11/1988 | Japan | 477/48 |
| 531 | 1/1993 | WIPO | 477/48 |

OTHER PUBLICATIONS

Patent Abstracts of Japan–Publication No. JP62099226, dated May 8, 1987 "Method of Controlling Stepless Speed Change Gear".
Patent Abstracts of Japan–Publication No. JP61115735, dated Jun. 3, 1986 "Control Unit of Power Transmission System for Vehicles".
Patent Abstracts of Japan–Publication No. JP62139731, dated Jun. 23, 1987 "Control Device for Continuously Variable Transmission".
Patent Abstracts of Japan–Publication No. JP62137239, dated Jun. 20, 1987 "Method of Continuously Variable Transmission Provided with Subtransmission for Vehicle".

*Primary Examiner*—Timothy S. Thorpe
*Attorney, Agent, or Firm*—Pennie & Edmonds

[57] ABSTRACT

To obtain a flexible transmission system which can be adjusted to the meet the individual desires of a driver, the choice of the desired value of the rate of revolution of the primary axle in the system, based on the current position of an accelerator pedal, and based on the current rate of revolution of the secondary axle of the system, is influenced, whereby several sub ranges are composed from the range of possible desired rate of revolution values of the primary axle, so that the possible positional values of the accelerator pedal can be combined with one of the sub ranges, to choice. A sub range preferably serves as a model for a desired type of driving program. If desired, the boundary values of the sub range can be continuously adjusted through the use of potentiometers which are operated by the driver. To assist in the realization of a simple-to-implement digital construction, the sub range values are stored in a memory.

3 Claims, 1 Drawing Sheet

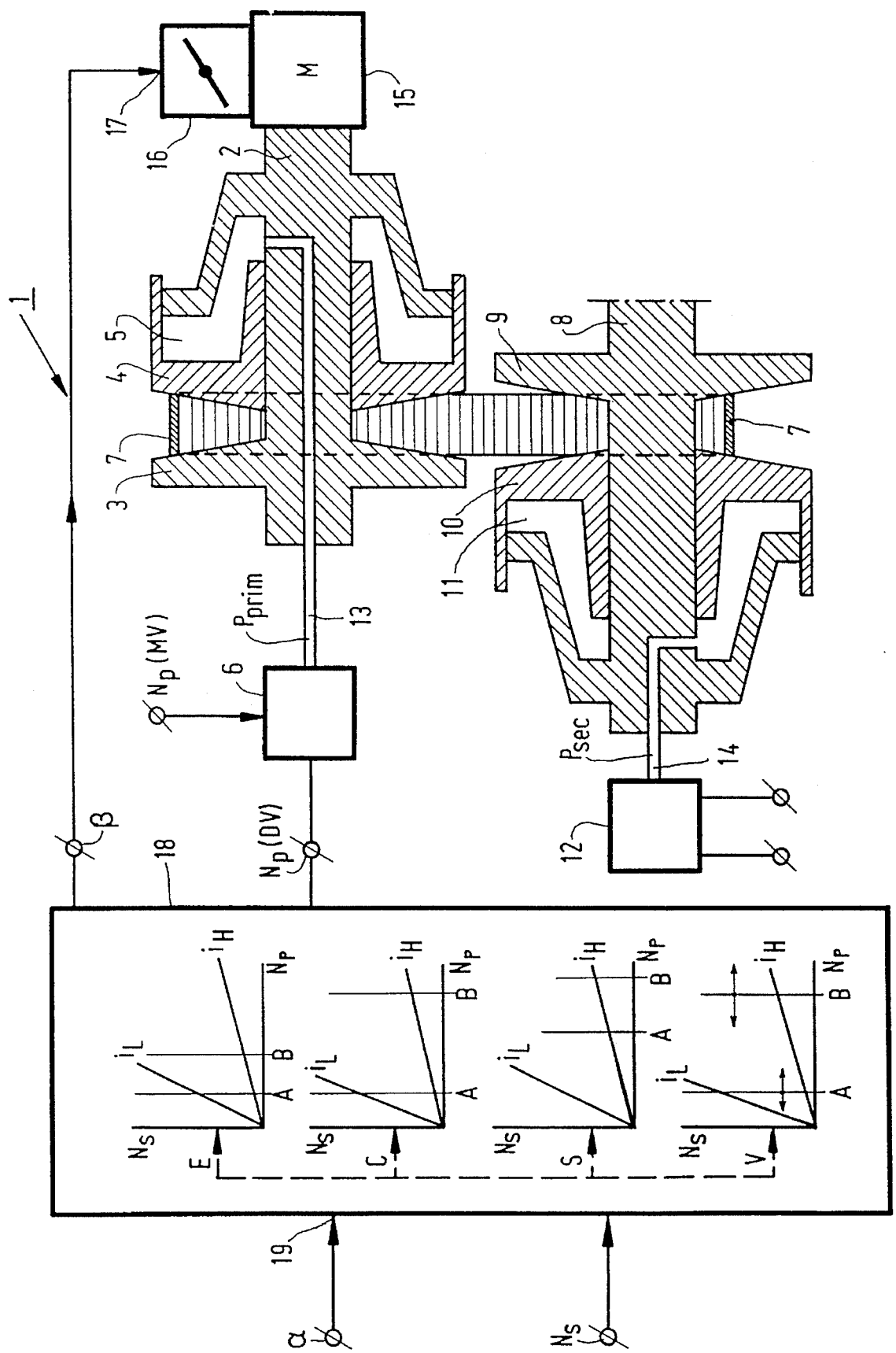

METHOD FOR INFLUENCING THE DRIVING BEHAVIOUR OF A VEHICLE WITH A CONTINUOUSLY VARIABLE TRANSMISSION

DESCRIPTION

The invention pertains to a method for influencing the transmission ratio in a continuously variable transmission, whereby the choice of a desired value $N_p$ (DV) of the rate of revolution of the primary axle (2) of the system occurs on the basis of the current positional values ($\alpha$) of an accelerator pedal and a current rate of revolution value $N_s$ of the secondary axle (8) of the system.

Moreover, the invention pertains to a continuously variable transmission system, provided with a transmission with a primary pulley and a secondary pulley, whereby each pulley includes two discs, between which discs a driving belt is fitted, which belt's working radii can be varied by means of control means fitted to an adjustable portion of one or both pulleys, and provided with selection means with an input for the application of an accelerator pedal signal ($\alpha$) and an input for the application of a signal $N_s$, which signal is a measure of the value of the rate of revolution $N_s$ of the secondary axle, and an output $N_p$ (DV) for the selected desired value of the rate of revolution $N_p$ (DV) of the primary axle, which output is connected to said selection means.

Such a method and such a continuously variable transmission system are known from EP-A-0451887.

A particular selection circuit is known from the above, wherein the accelerator pedal signal ($\alpha$), together with a signal $N_s$, which signal is a measure of the current value of the rate of revolution of the secondary axle, is used to select a desired value $N_p$ (DV) of the rate of revolution of the primary axle, with which selection circuit control means coupled to the adjustable portion of the primary pulley are driven, in order to thereby influence the transmission ratio.

As such, the known method and the known system function satisfactorily; however, it appears in practice that there is an increasing demand for a more flexible and universally applicable system.

The goal of the invention in question is to increase the degree of acceptability of the continuously variable transmission to the public at large, and to further improve the comfort and control thereof, and to endow it with a greater flexibility and applicability by creating the possibility of equipping the system to allow it to meet the individual requirements of any driver.

To this end, the method according to the invention is characterised in that one or more sub ranges from the range of possible desired rate of revolution values $N_p$ of the primary axle are composed, and that the possible positional values ($\alpha$) of the accelerator pedal can be combined with one of the said sub ranges, to choice.

Of advantage in the application of the method according to the invention is that the flexibility in controlling the continuously variable transmission system is increased, due to the fact that said method provides the possibility of selecting a preferred range in the form of a certain sub range, whereby the domain of the accelerator pedal position signal ($\alpha$) can be mapped to a selectable sub range of desired values $N_p$ (DV) of the rate of revolution of the primary axle.

In an embodiment of the method according to the invention, each sub range is composed in such a way that the content serves as a model for a desired driving programme.

Of advantage thereby is that in principle the desired driving programme can be established and modified by the driver himself to suit his individual related needs at the time.

In a further embodiment of the method according to the invention, the boundary values of the sub range are continuously adjustable, whereby at any moment a target driving performance can be optimally matched to the individual needs of the driver.

Characteristic of the continuously variable transmission system according to the invention, is that the selection means are arranged in such a way that one or more sub ranges are composed from a range of possible desired rate of revolution values $N_p$ of the primary axle, which sub ranges are stored in a memory of the selection means, whereby boundary values of a sub range correspond to accelerator pedal positions of 0% and 100%, respectively.

The invention shall be, together with its further advantages, elucidated on the basis of the attached drawings. The figure thereby depicts a schematic rendition of a continuously variable transmission system in accordance with the invention, which figure will also be used to elucidate the method according to the invention.

The figure shows a continuously variable transmission 1, containing a primary axle 2, upon which primary axle a primary pulley in the form of primary conical pulley discs 3 and 4 is fitted. The pulley disc 3 hereof is fixed rigidly to the primary axle 2 and the primary pulley disc 4 is movable over the axle 2 by means of the exertion of a hydraulic pressure in a primary pressure chamber 5. The control of the pressure in the primary pressure chamber 5 occurs through the use of primary control means 6 connected to the pressure chamber 5. The working radii of a driving belt 7 fitted between pulley discs 3 and 4 can be thereby adjusted.

Moreover, the transmission 1 contains a secondary axle 8, to which axle a pulley with secondary conical pulley discs 9 and 10 is fitted. Pulley disc 9 is fixed rigidly to the axle 8 and pulley disc 10 is fitted to the axle 8 in such a way that it can be slid. The pulley disc 10, which can be axially slid on the axle 8, is displaced by the exertion of a hydraulic pressure in a secondary pressure chamber 11, which pressure chamber is connected to secondary control means 12, to which secondary control means signals outside the scope of this description are supplied.

The primary and secondary control means 6 and 12, respectively, are connected to the pressure chambers 5 and 11, respectively, by means of pipes 13 and 14, respectively. Moreover, the driving belt 7 is laid between the secondary pulley discs 9 and 10. The tension in the driving belt 7 is maintained through the exertion of a hydraulic pressure in a secondary pressure chamber 11 by the secondary control means 12.

Signals which are used to determine the values of the pressures $P_{prim}$ and $P_{sec}$, respectively, in the pressure chambers 5 and 11, respectively, are supplied to the control means 6 and 12 by means of input terminals. Further details are explained in the patent application EP-A-0451887.

In addition to the transmission 1, the continuously variable transmission system contains an engine 15 coupled to the primary axle 2, which engine is controlled with the aid of a fuel supply device 16. The device 16 contains a steering input 17 to which a fuel supply rate control signal B provided by selection means 18 is delivered. Moreover, the selection means 18 contain an input 19, to which by non-depicted means an input signal $\alpha$, which signal contains a measure of the position of the accelerator pedal in a vehicle, is delivered. The signal $\beta$ at control input 17, which signal is based on signal $\alpha$, is generated in the control device 18. Preferably, an adjustable relationship exists between the signals $\alpha$ and $\beta$, whereby the flexibility and the variability of the continuously variable transmission system are increased and a wide application range for a large group of users is created.

Four driving characteristics indicated by E, C, S, and V, respectively, are included within the scope of the selection means 18, within which driving characteristics the rate of revolution $N_s$ of the secondary axle 8 is reproduced, which rate of revolution is a measure for the speed of the vehicle as a function of the rate of revolution $N_p$ of the primary axle 2, which rate is representative of the rate of revolution of the engine 15. The symbols represent, successively, economic, comfortable, sporty and variably-selectable driving programmes.

Lines are drawn through the origin, whereby the line marked $i_L$ indicates the lowest possible transmission ratio (highest gear), while the line marked $i_H$ indicates the highest possible transmission ratio (lowest gear). The transmission ratio i hereby, is defined as the quotient of the rate of revolution $N_p$ of the primary axle and the rate of revolution $N_s$ of the secondary axle.

The symbols A and B, which stand for the lower and upper limits of $N_p$, respectively, are placed beside vertical lines in the various characteristics, which vertical lines indicate the boundaries of subsets of the desired choices for the rate of revolution $N_p$ of the primary axle. In the case of the characteristic V, the limits A and B are variable and the placement thereof can be influenced by means of one or more non-depicted potentiometers, the positions of which potentiometers can be adjusted by the driver of the vehicle to choice. Once, for example, a choice is made by means of a switch for a characteristic stored in a non-depicted memory of the selection means 18, the result hereof is that for $\alpha=100\%$ (fully depressed accelerator pedal), the corresponding upper limit B is chosen and for intermediary values, the value of $N_p$, which value is selected on the basis of $N_s$, is chosen and delivered to the output $N_p$ (DV). In general, $\alpha=0\%$ shall correspond to the lower limit A of $N_p$.

The functioning of the system is such that after choosing a certain driving characteristic on the basis of signals $\alpha$ and $N_s$, a certain value of $N_p$ (DV) is selected, which value is compared in control means 6 with a current, measured value $N_p$ (MV) of the rate of revolution of the primary axle 2. The pressure $P_{prim}$ is influenced on the basis of the difference between $N_p$ (DV) and $N_p$ (MV), whereby the current rate of revolution of the primary axle 2 changes. Given a certain value of the accelerator pedal signal $\alpha$ and of the signal $\beta$, the engine 15 shall start to operate at the modified current value of the primary axle 2 and shall deliver a torque to the axle 2, which torque is in harmony with the position of the fuel supply device 16, which position is determined by the value of the signal b.

The choice between the different driving characteristics and/or the adjustable limits A and B can be made, if desired, with the assistance of fuzzy logic. Every desired relation of $N_p$ can be placed between the limits A and B. The relation may be, but does not necessarily have to be, linear.

We claim:

1. A method for controlling a continuously variable transmission system having at least a power source controllable by an accelerator pedal, a primary axle connected to said power source and operable over a range of primary axle rates of revolution, and a secondary axle connected to the primary axle, the method comprising the steps of:

selecting one from among a plurality of predetermined sub-ranges of primary axle rates of revolution, each said sub-range having a lower limit and an upper limit within said range;

measuring a current position of the accelerator pedal and a current rate of revolution of the secondary axle;

determining, within the selected sub-range, a desired rate of revolution of the primary axle based on the current position of the accelerator pedal and the current rate of revolution of the secondary axle; and controlling a transmission ratio of the continuously variable transmission system using said desired rate of revolution of the primary axle.

2. The method of claim 1 wherein each sub-range corresponds to a type of driving program.

3. The method of claim 1 comprising the additional step of varying, within the range, at least one limit of the selected sub-range, prior to the step of measuring the current position of the accelerator pedal and the current rate of revolution of the secondary axle.

* * * * *